L. LE B. MOUNT.
GLASS MELTING FURNACE.
APPLICATION FILED MAY 6, 1920.
1,395,591.
Patented Nov. 1, 1921.
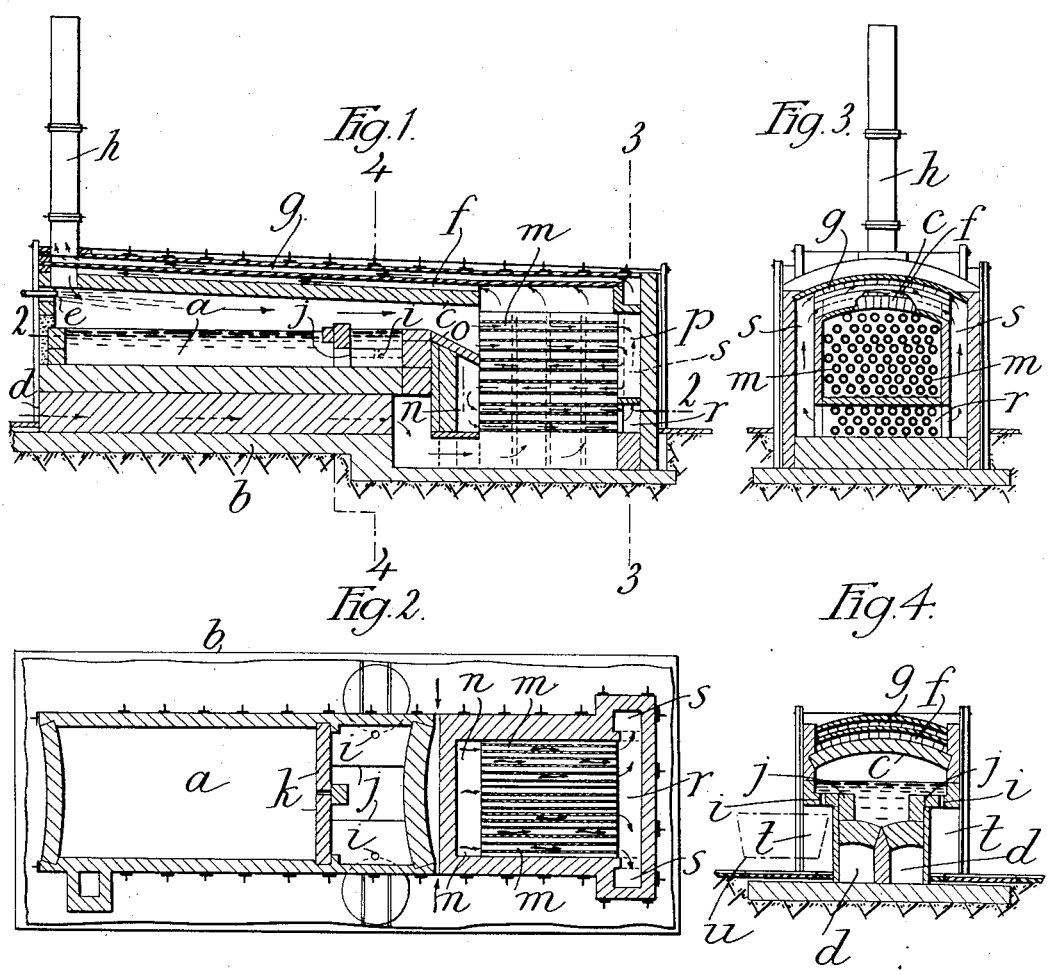
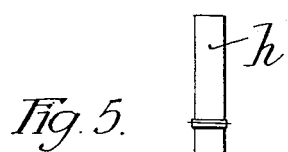

UNITED STATES PATENT OFFICE.

LAMBTON LE BRETON MOUNT, OF ST. JOHN'S WOOD, LONDON, ENGLAND.

GLASS-MELTING FURNACE.

1,395,591. Specification of Letters Patent. Patented Nov. 1, 1921.

Application filed May 6, 1920. Serial No. 379,203.

*To all whom it may concern:*

Be it known that I, LAMBTON LE BRETON MOUNT, a subject of the King of Great Britain and Ireland, residing at St.. John's Wood, in the county of London, England, have invented Improvements in Glass-Melting Furnaces, of which the following is a specification.

This invention relates to glass melting furnaces of the kind in which the tank for molten glass is located below an arched crown formed with longitudinal passages for air that is heated by a recuperator arranged at the rear end of the said tank.

Objects of the invention are, to provide an improved arrangement of outlets suitable for the feeding of molten glass to automatic or other glass ware machines worked on the flow-feed system, to provide an improved construction of recuperator, and an improved system of flues or longitudinal passages in the furnace crown.

For these purposes according to the invention each flow feed outlet is located at the end of the tank adjacent to the recuperator and consists of a hole formed through a raised portion of the bottom of the tank at the side or end thereof. The hole through the raised portion of the tank bottom permits the molds of a glass bottle machine to go under the glass in the tank and to be vertically fed therefrom. The recuperator is constituted by a group of superimposed tubes of refractory material so supported as to allow air to support combustion to flow upwardly around and between the tubes from an air passage located below the glass tank into air passages arranged in the furnace crown below other passages in the furnace crown through which the hot products of combustion pass to the chimney which is at the front end of the furnace. The recuperator tubes are so arranged in relation to flue chambers formed in the brickwork setting that the hot gases leaving the furnace are caused to flow to and fro through the tubes during their passage to the rear end of the said upper passages in the furnace crown. The longitudinal passages formed in the furnace crown are made by building in the hollow furnace crown, tiles suitably spaced apart to provide for expansion and contraction.

By arranging the flow feed outlets in the positions described there is no necessity to provide any means for heating the glass as it flows out in order to maintain the necessary fluidity for by such outlets being located under the hottest parts of the hollow furnace crown and near to the recuperator the out flowing glass is maintained in such a desirable fluid state as to facilitate the quick and efficient feeding of automatic glass ware machines for example.

One construction of glass furnace embodying the invention is illustrated in the accompanying drawings whereof Figure 1 is a central longitudinal section, Fig. 2 a horizontal section on the line 2—2 of Fig. 1 and Figs. 3 and 4 vertical transverse sections corresponding respectively to the lines 3—3 and 4—4 of Fig. 2, Fig. 5 is an end elevation of the same.

As here shown the molten glass tank $a$ is so supported between a foundation $b$ and the underside wall $c$ of a hollow crown that free air entering at $d$ pursues a path the same in direction as that of products of combustion derived from a fluid fuel nozzle or burner $e$, until a recuperator is reached where the paths of the air and products of combustion are changed in direction relatively to one another to secure a high degree of heat interchange, after which the heated air is caused to flow along a series of passages $f$ above the wall $c$ of the hollow crown while the waste gases pursue a path the same in direction along a series of passages $g$ above the passages $f$, the last named passages opening into the furnace in the neighborhood of the burner $e$ while the passages $g$ communicate with a chimney stack $h$. In this example two vertical flow feed outlets $i$ are located one near each side of the furnace in the raised portions $j$ at the rear of the molten glass tank behind a bridge $k$ below which the molten glass has to flow in order to be discharged, the said bridge insuring only molten glass passing into the discharging zone at the rear end of the furnace. The recuperator consists of groups of cylindrical tubes $m$ of refractory material and between the recuperator and the tank $a$ is a chamber $n$ having a roof $o$ that inclines downwardly in a rearward direction over which the hot gases flow to the upper group of recuperator tubes to a chamber $p$ at the rear of the recuperator from which they flow through the middle group of recuperator tubes to the said chamber $n$ between the recuperator and the furnace tank, and from said chamber the gases flow back through the lower group of recuperator tubes to a further chamber $r$ at the rear of the recuperator from which, through vertical side passages $s$, the gases flow to the upper series of longitudinal passages $g$ in the furnace crown and thence to the chimney.

The sides of the furnace walls below the tank are formed with recesses $t$ below the raised regions $j$ where the flow feed openings $i$ are placed, to receive the mold carrying tables $u$.

What I claim is:—

A glass melting furnace comprising a tank for molten glass having raised bottom regions at opposite sides thereof and a vertical flow feed outlet through each such region, a bridge beneath which the molten glass is constrained to flow before reaching the raised bottom portions aforesaid, fluid fuel burning means at and above one end of the tank, a recuperator at the opposite end thereof, and a casing having recesses below the raised bottom regions of the tank for the reception of molds into which the glass is to be delivered.

Signed at London, England, this fifteenth day of April, 1920.

LAMBTON LE BRETON MOUNT.